(12) United States Patent
Brandy

(10) Patent No.: US 6,380,114 B1
(45) Date of Patent: Apr. 30, 2002

(54) INSULATING REFRACTORY MATERIAL

(75) Inventor: Gilbert Brandy, Maubeuge (FR)

(73) Assignee: Vesuvius Crucible Company, Wilmington, DE (US)

( * ) Notice: Subject to any disclaimer, the term of this patent is extended or adjusted under 35 U.S.C. 154(b) by 0 days.

(21) Appl. No.: 09/719,848

(22) PCT Filed: Jun. 7, 1999

(86) PCT No.: PCT/BE99/00073

§ 371 Date: Feb. 16, 2001

§ 102(e) Date: Feb. 16, 2001

(87) PCT Pub. No.: WO99/65842

PCT Pub. Date: Dec. 23, 1999

(30) Foreign Application Priority Data

Jun. 15, 1998 (FR) .............................. 98 07608

(51) Int. Cl.⁷ ............................... C04B 35/14
(52) U.S. Cl. .................. 501/128; 501/133; 501/154
(58) Field of Search ................. 501/128, 133, 501/154; 252/62

(56) References Cited

U.S. PATENT DOCUMENTS

| | | | |
|---|---|---|---|
| 4,292,348 A | | 9/1981 | Dolan |
| 4,874,726 A | | 10/1989 | Kleeb et al. |
| 4,950,627 A | * | 8/1990 | Tokarz et al. |
| 5,252,526 A | * | 10/1993 | Whittemore |
| 5,602,063 A | * | 2/1997 | Dody et al. |
| 5,753,573 A | * | 5/1998 | Rorabaugh et al. |
| 5,766,686 A | | 6/1998 | Perich et al. |
| 5,840,433 A | | 11/1998 | Juma |
| 5,849,650 A | * | 12/1998 | Rorabaugh et al. |
| 5,944,888 A | * | 8/1999 | Perich et al. ............... 106/600 |

FOREIGN PATENT DOCUMENTS

| | | |
|---|---|---|
| DE | 196 27 961 A | 1/1998 |
| EP | 0 235 914 A | 9/1987 |

OTHER PUBLICATIONS

Regis M. Perich, "Spray Insulating Coating for Refractory Articles," Proceedings of Unitea '97 Conference, Nov. 4–7th, 1997 in New Orleans.

* cited by examiner

Primary Examiner—Paul Marcantoni
(74) Attorney, Agent, or Firm—James R. Williams

(57) ABSTRACT

The invention concerns an insulating material comprising 20–80 wt. % of a ceramic matrix, 5–40 wt. % insulating microspheres, 0.5–15 wt. % of one or more binders, and up to 5 wt. % water. The material may also contain 0.5–4 wt. % deflocculant and 0.5–4 wt. % colloidal silica. The ceramic matrix comprises vitreous grains, notably atomized silica. The insulating microspheres are hollow spheres comprising 55–65 wt. % silica and 27–33 wt. % alumina.

13 Claims, No Drawings

INSULATING REFRACTORY MATERIAL

FIELD OF THE INVENTION

The present invention relates to an insulating material for use on refractory articles.

1. Background of the Invention

Insulating refractory materials are used in industry, notably in metallurgy, for reducing heat losses and for saving energy. These materials can also be used for coating an article. They can also be used for producing an insulating component in the material itself. They can also be used to produce elements such as panels or bricks that will be used severally to form an insulating unit.

For example, refractory material components are used in the continuous casting of steel for the transfer of molten steel between various containers. notably between the ladle and the distributor, and the continuous casting mold. These components should be made more insulating thermally to improve the preheating efficiency (when the components are preheated), to avoid solidification of the steel an the inside walls of the taphole and, in the case of pouring components used for a distributor, to avoid bridging between the casting component and the mold walls.

According to another example, to improve the preheating efficiency of the distributor stopper rods, a sleeve of insulating refractory material that is fitted on the stopper rod and retains the heat of the burner is used.

It is customary to use sheets or mats of paper impregnated with ceramic fibers as the insulating refractory material. This material guarantees a good quality of the thermal insulation, but presents several shortcomings.

The placement of the ceramic paper requires operations of cutting, placement and gluing that are long and tedious. Furthermore, the handling of sheets or plates of ceramic paper permits the escape of carcinogenic ceramic fibers that can be inhaled by the operators.

An insulating refractory coating for steel casting components is also known (EP 0 296 981). This coating is obtained from a composition of an aqueous suspension containing 30–85% by weight of a finely divided constituent such as fused silica, alumina or zirconia powders and alumina beads, a ceramic charge of fibers of alumina silica, zirconia, titanium dioxide or chrome-alumina, or even alumina or zirconia beads. This composition is also comprised of up to 7% by weight of a binder such as sodium hexametaphosphate or sodium silicate, and up to 40% by weight of glass generating frit.

Such a coating avoids some of the disadvantages of plates of ceramic paper impregnated with ceramic fibers. In particular, it is more rapid to install because it does not require a large number of operations. In addition, it can facilitate avoiding the presence of ceramic fibers that are dangerous for the health of the operators. However, it presents certain disadvantages. Its thermal insulation characteristics are not very good due to its low porosity (ca. 20%). This porosity is essentially open, which assures less good thermal insulation characteristics than a closed porosity. Furthermore, it is difficult to deposit a substantial thickness of coating on a casting. To increase the thickness of the coating, it is necessary to preheat the components before coating them, which requires a supplementary stage and implies a supplementary cost. Furthermore, after having deposited a first layer, it is not possible to deposit a second layer because the outer surface of the coating is smooth and impermeable, which does not permit a good adhesion of the second layer.

2. Description of the Invention

The object of the present invention is an insulating refractory material that remedies these shortcomings. This insulating refractory material is comprised of 20–80% by weight of a ceramic matrix, 5–40% by weight of insulating microspheres, 0.5–15% by weight of one or more binders and up to 5% by weight of water. The matrix can be a matrix of vitreous grains, notably silica, preferably atomized silica; it may also comprises non-vitreous grains such as alumina or magnesia. Preferably, the matrix does not comprise more than 30% by weight of the matrix of non-vitreous grains.

U.S. Pat. No. 4,874,726 discloses a refractory material having a high abrasion resistance and a relatively low thermal conductivity. This material comprises from 40 to 95% by weight of vitreous silica, up to 25% by weight of a calcined refractory aggregate and the balance of a calcium aluminate cement (binder). For each 100 parts of this mix, the material further comprises from 3 to 15% by weight of alumina-silica based microspheres. This composition intended for the formation of refractory pieces by cast in or gunning, has a viscosity, when mixed with the appropriate amount of water, of about 4 to about 6 Pa.s. This extremely low viscosity, usual for the formation of refractory pieces by casting operations, is not compatible with the formation of a coating by immersion.

The material can also have up to 4% by weight of a deflocculant and up to 20% by weight of colloidal silica. Preferably, it has from to 0.5 to 4% by weight of a deflocculant and from 0.5 to 20% by weight of colloidal silica.

The insulating microspheres may be hollow spheres of a material based on silica and alumina. This material contains 55–65% by weight of silica and 27–33% by weight of alumina.

The main characteristic of the binder of the invention is that it must confers to the aqueous composition (i.e. the slip) used in making the refractory material of the invention, a viscosity compatible with the formation of a coating by dipping or immersing the refractory piece into said slip. The formation of a regular and homogeneous coating depends indeed largely upon the viscosity of the slip. A suitable viscosity is generally higher than 8 Pa.s and preferably higher than 10 Pa.s.

Binders that might be used according to the invention are clays of the kaolinite type and organic binders such as the polysaccharides (e.g., dextrine).

These binders confer to the aqueous composition a viscosity which perfectly fulfills the above discussed requirements.

The invention also concerns a component, notably for casting steel, having a body of refractory material coated with the insulating material of the invention. The component can also be a composite piece produced partially of the material of the invention. This component can be produced, e.g., cast, in a single operation or formed of several assembled pieces.

The invention also concerns a process for preparing a composition for effecting an insulating coating or making an insulating piece.

According to this process:
one or more binders are dissolved in a quantity of water;
a deflocculant is added;
grains of atomized vitreous silica are added while agitating the solution to hydrate them and form a slip;
microspheres of an insulating material are added while continuing to agitate the slip to keep it homogeneous.

In a preferred variant of the process, colloidal silica is added after the deflocculant. The composition used in making the material can be a slip containing from 20 to 70% by weight of atomized vitreous silica grains, from 5 to 40% by weight of insulating microspheres, from 0.5 to 20% by weight of one or more binders and from 5 to 25% by weight of water. It may further comprises up to 4% by weight of a deflocculant and up to 10% by weight of colloidal silica. Preferably, it further comprises from 0.5 to 4% by weight of a deflocculant and from 0.5 to 10% by weight of colloidal silica. Such a composition has a viscosity of between 9 to 12 Pas.

The invention also concerns a refractory component having an insulating coating.

The invention also concerns a process for coating a piece of refractory material used in the casting of molten metal, particularly steel with the composition of the invention.

According to this process:

the piece is dipped at ambient temperature in a composition as described above for a time less than one minute;

it is allowed to dry in the open air for 2–4 hours.

It is possible to produce several layers with the aid of this process.

a first layer of slip is deposited on the piece by the first immersion;

the piece is allowed to dry in the open air for 45 minutes to 2 hours;

a second layer of slip is deposited on the piece by the second immersion;

the piece is allowed to dry in the open air for 2–4 hours.

The material of the invention presents numerous advantages.

It is easier to apply than the papers and mats of ceramic fibers. Nor does it generate fibers dangerous for health.

With regard to the coatings previously known, it assures a better thermal insulation because its porosity is greater and because the portion of closed porosity, furnished by the insulating microspheres, is more substantial. Furthermore, thanks to the particular viscosity of the slip, the quality of the thermal insulation is improved because it is possible to deposit a greater coating thickness on the piece without impairing the insulation characteristics. This thickness can range up to 4 mm in a single layer and up to 7 mm in two layers.

Finally, it is readily possible to produce insulating pieces totally or partially of this material.

Other characteristics and advantages of the invention will become evident from the following detailed description and the implementation examples.

EXAMPLE I

A steel casting component. such as a nozzle, comprised of an elongated alumina-graphitied body is coated with a coating of insulating refractory material. A slip in which the piece will be immersed is prepared for this purpose. To prepare the slip, an organic binder, e.g., dextrine, is dissolved in an appropriate amount of water. Dextrine is a polysaccharide that provides raw mechanical strength. It is also a viscosity agent. It is eliminated in place during preheating of the piece.

A second binder is added, e.g. a clay of the kaolinite type. Clay is an agent for suspending, insulating microspheres and atomized silica grains. It also contributes to raw cohesion. It is necessary to agitate the composition continuously during the addition of dextrine and clay in order to guarantee homogeneity, and particularly in the case of clay, to hydrate it completely and avoid its agglomeration into aggregates. This agitation, is obtained preferably by means of a planetary-type mixer, e.g., one of the COUVROT-LAINE brand. A deflocculant is then added, for example, of the type known under the commercial reference DOLAPIX CE 64, sold by the German company ZSCHIMMER & SCHWARZ. DOLAPIX is a dispersant/deflocculant for raw materials and ceramic masses based on carboxylic acid without allali, particularly destined for the deflocculation of ceramic oxides, steatites, etc.

Colloidal silica is added in the form of a liquid solution with 30% colloidal silica and grains of atomized silica are introduced. These grains are obtained by pulverization of a silica slip in a stream of air. The liquid droplets in suspension in air have a size from 50 $\mu$m to 1.5 mm in diameter. By elimination of the water in a stream of hot air, more or less complete microspheres of silica are obtained.

Finally, insulating microspheres, e.g., of alumina silicate and of a size between 5 and 500 $\mu$m are added. These microspheres are very light. The inherent density of the material constituting them is between 2.7 and 2.8 g/cm$^3$ but, because these microspheres are hollow, the apparent density of the microspheres is only 0.6–0.8 g/cm$^3$. These microspheres thus assure a very good thermal insulation. Naturally, as discussed above, it is necessary to continuously agitate the composition during the successive addition of each of the components.

The composition of the invention that has a viscosity of 12 Pa.s can be deposited on the piece by any appropriate method., e.g., by spattering. However, the application of the coating is preferably done by immersion.

The piece is immersed in the composition at a rate that can be relatively substantial (several meters per minute). The piece is kept immersed for less than 1 minute, e.g., 30 seconds. The piece is withdrawn from the bath. The rate of withdrawal should be relatively slow, e.g., less than 3 meters per minute. The piece is then allowed to drain above the bath for less than 1 minute, e.g., some 30 seconds, then, it is allowed to dry in air. If only one layer is applied, the drying time in the open air will be 2–4 hours. If 2 or more layers are applied, the drying time in air is shorter, e.g., from 45 minutes to 2 hours before the application of the next layer. Finally, the last layer is allowed to dry for 2–4 hours as for a single layer coating. The pieces can then be dried thoroughly in a kiln at a constant temperature of 120° C. for one hour.

Example of the composition

| | |
|---|---|
| Water | 20.0% |
| Dextrine | 3.2% |
| Colloidal silica | 1.0% |
| Dolapix CE 64 | 2.0% |
| Fillite SG 500 | 10.0% |
| Clay (HYMOD RF CLAY) | 4.6% |
| Atomized vitreous silica grains | 59.2% |

The chemical composition of the coating obtained from this composition, is as follows:

| INGREDIENTS | % (BY WEIGHT) |
|---|---|
| $SiO_2$ | 91.94 |
| $Al_2O_3$ | 6.32 |
| $TiO_2$ | 0.11 |
| $Fe_2O_3$ | 0.62 |
| CaO | 0.02 |
| MgO | 0.03 |
| $Na_2O$ | 0.02 |
| $K_2O$ | 0.13 |
| Burning loss | 0.56 |

The density of the coating obtained is less than 1.1, its specific weight is 1.5 to 2 g/cm$^3$ and its porosity is 40 to 55%.

EXAMPLE II

A preheating sleeve is produced for a tundish stopper rod. The sleeve has a cylindrical part that fits on the outside diameter of the stopper rod and a flared internal part that completely covers the taphole of the distributor. This sleeve was made of the insulating refractory material of the invention by pouring a slip in a plaster mold.

EXAMPLE III

A pouring spout cover plate was made for the glass industry. The plate is a parallelepiped having a thickness of 50 mm. This plate is made of the insulating refractory material of the invention by pouring in a plaster mold.

What is claimed is:

1. A refractory article adapted for use in the casting of molten metal comprising a body having an outer surface at least partially coated by an insulating refractory material made from a slip comprising 20–80 wt. % atomized vitreous grains of a refractory oxide, 5–40 wt. % aluminia-silicate insulating microspheres, 5–25 wt. % water, and 0.5–20 wt. % of at least one binder conferring a viscosity greater than 8 Pa.s to the slip, wherein the insulating refractory material is formed by immersing the article at least partially in the slip and drying the slip to form the insulating refractory material.

2. The refractory article of claim 1, wherein the vitreous grains comprise silica.

3. The refractory article of claim 1, wherein the slip comprises up to 4 wt. % deflocculant.

4. The refractory article of claim 1, wherein the slip comprises up to 20 wt. % colloidal silica.

5. The refractory article of claim 1, wherein the insulating microspheres comprises 55–65 wt. % silica and 27–33 wt. % alumina.

6. The refractory article of claim 1, wherein the binder is an organic binder.

7. The refractory article of claim 1, wherein the organic binder comprises a polysaccharide.

8. The refractory article of claim 1, wherein binder comprises a kaolinite clay.

9. The refractory article of claim 1, wherein the insulating refractory material is formed by immersing the article in the slip for less than one minute and drying in air for at least two hours.

10. The refractory article of claim 1, wherein the insulating refractory material comprises a plurality of layers.

11. The refractory article of claim 1, wherein the article comprises a nozzle for transferring molten metal.

12. The refractory article of claim 1, wherein the article comprises a preheating sleeve for a stopper rod.

13. A refractory nozzle for transferring molten metal from a metallurgical vessel, the nozzle having an outer surface at least partially coated by an insulating refractory material made from a slip comprising 20–80 wt. % atomized vitreous grains of silica, 5–40 wt. % alumina-silicate insulating microspheres, 5–25 wt. % water, and 0.5–20 wt. % of at least one binder conferring a viscosity greater than 8 Pa.s to the slip, wherein the slip is applied to the outer surface by dipping the nozzle at least partially in the slip and the slip is dried to form the insulating refractory material.

* * * * *